United States Patent
Abolhassani (10) Patent No.: US 10,184,534 B2
(45) Date of Patent: Jan. 22, 2019

(54) FRICTIONLESS ELECTROMAGNETIC BRAKING SYSTEM

(71) Applicant: Mehdi Abolhassani, Houston, TX (US)

(72) Inventor: Mehdi Abolhassani, Houston, TX (US)

( * ) Notice: Subject to any disclaimer, the term of this patent is extended or adjusted under 35 U.S.C. 154(b) by 0 days.

(21) Appl. No.: 15/225,903

(22) Filed: Aug. 2, 2016

(65) Prior Publication Data

US 2017/0037915 A1 Feb. 9, 2017

Related U.S. Application Data

(60) Provisional application No. 62/200,991, filed on Aug. 4, 2015.

(51) Int. Cl.
| | |
|---|---|
| *B60L 7/14* | (2006.01) |
| *B60L 7/28* | (2006.01) |
| *B61H 7/08* | (2006.01) |
| *B60T 13/58* | (2006.01) |
| *B60T 13/74* | (2006.01) |
| *F16D 63/00* | (2006.01) |
| *F16D 65/16* | (2006.01) |
| *F16D 121/20* | (2012.01) |

(52) U.S. Cl.
CPC .............. *F16D 63/002* (2013.01); *B60L 7/14* (2013.01); *B60L 7/28* (2013.01); *B60T 13/586* (2013.01); *B60T 13/748* (2013.01); *B61H 7/083* (2013.01); *F16D 65/16* (2013.01); *F16D 2121/20* (2013.01)

(58) Field of Classification Search
CPC .... F16D 63/002; F16D 65/16; F16D 2121/20; B60L 7/14; B60L 7/28; B60T 13/586; B60T 13/748; B61H 7/083
USPC ....... 303/152, 20; 188/158, 171; 310/77, 78, 310/103
See application file for complete search history.

(56) References Cited

U.S. PATENT DOCUMENTS

| | | | | |
|---|---|---|---|---|
| 3,767,015 | A | * | 10/1973 | Odier ...................... F16D 65/84 188/264 D |
| 5,130,593 | A | * | 7/1992 | Connell ................. H02K 19/20 310/256 |
| 5,333,706 | A | * | 8/1994 | Mori ......................... B60L 7/24 188/156 |
| 5,731,645 | A | * | 3/1998 | Clifton ................ F16C 32/0459 310/178 |
| 5,746,294 | A | | 5/1998 | Lee |
| 6,336,530 | B1 | * | 1/2002 | Hottle ................. F16D 55/2245 188/161 |
| 6,557,673 | B1 | * | 5/2003 | Desta .................... B60T 13/748 188/267 |
| 6,698,554 | B2 | * | 3/2004 | Desta ....................... B60L 7/28 188/158 |
| 7,051,846 | B2 | * | 5/2006 | Lee ..................... F16D 65/0037 188/158 |
| 2011/0214954 | A1 | * | 9/2011 | Tashiro ............. H02K 11/0094 188/267 |

* cited by examiner

*Primary Examiner* — Pamela Rodriguez
(74) *Attorney, Agent, or Firm* — Trop, Pruner & Hu, P.C.

(57) ABSTRACT

A frictionless electromagnetic braking system utilizes linear alternators which are controlled by a power electronics converter interface to capture the car's kinetic energy and generate braking force on the wheel. The alternators are engaged by driver or operator input.

20 Claims, 9 Drawing Sheets

FRICTIONLESS ELECTROMAGNETIC BRAKING SYSTEM

This application claims the benefit of U.S. Provisional Application No. 62/200,991, filed on Aug. 4, 2015, in the name of Mehdi Abolhassani entitled "Frictionless Electromagnetic Braking System."

BACKGROUND

This disclosure pertains to an enhanced braking system in a vehicle or a moving device, and more specifically to a frictionless brake system employing electromagnetism.

Vehicular brake systems incorporating frictional or abrasive devices are known in the art. The drag force used to stop the moving object is provided by friction between two surfaces pressed together. Either directly or indirectly, these known brake systems slow or stop a moving object by dissipating its kinetic energy as heat. A tremendous amount of heat is generated on the brake parts.

Typical brake systems have a master cylinder that distributes hydraulic fluid upon actuation of a vehicle brake pedal through hydraulic fluid transmission lines. The fluid transmission lines from the master cylinder connect to a fluid distribution system that supplies fluid to both front and rear brakes of the vehicle.

One problem with an abrasive brake system is that the frictional surfaces or linings on the brake shoes or pads wear over time. Periodic monitoring and replacing the brake shoes or pads are necessary. If the brake pads are not timely changed, the braking system of the vehicle will not work properly and can cause fatal accidents. Moreover, the defective brake pads can cause damage to other parts of the vehicle, such as the rotor or brake drum.

Wheel locking is another problem with the currently known abrasive brake system. High moisture, mud, and hostile environments all interfere with the working of a known abrasive brake system.

Further, an abrasive brake system is environmentally un-friendly. Polluting particles are emitted into the environment by an abrasive brake system.

Also, a hydraulic booster pump and anti-lock braking system (ABS) are needed to improve the braking performance, but ABS will increase the stopping distance. A hydraulic system has about 0.6 seconds delay to build the pressure back to brake pads that increase stopping distance significantly.

Accordingly, there is a need for a braking system that addresses the drawbacks identified above.

SUMMARY

One aspect of the present invention pertains to enhancing braking systems in a vehicle or a moving object.

One object is to achieve a new way to safely stop the vehicle and to reduce the distance traveled during braking. Another object of this disclosure is to remove/reduce the wear on brake parts by utilizing this system. The system includes a compact electromagnetic device which is installed on each wheel. The devices capture the kinetic energy of the vehicle to generate braking force. Each wheel's frictionless brake is made of a double-side linear induction alternator. Linear alternators capture the car's kinetic energy upon the driver's, or the operator's, input. The stator of linear induction alternator acts as an inductor such that the alternator works at very large slip frequency to deliberately generate higher losses in the alternator. Hence, the stator magnetic fields induce large eddy currents in the brake disc (rotor). The induced eddy currents generate braking force that forces the wheel to stop. The amount of required braking force on each wheel is determined by a master brake controller and based on the driver's or operator's input. The amount of required braking force is communicated to wheel brake controllers. The wheel brake controller is made of a power electronics converter that controls the linear induction alternators.

DETAILED DESCRIPTION OF PREFERRED EMBODIMENTS

The present disclosure relates to an enhanced braking system in a vehicle, or a moving device, and more specifically to a frictionless brake system employing electromagnetism. As used herein, a "vehicle" means an automobile, a truck, a motor cycle, a tractor, a farm equipment, or an airplane. A "moving device" a rotating device or machinery, such as a fan or a propeller.

Figure 1:
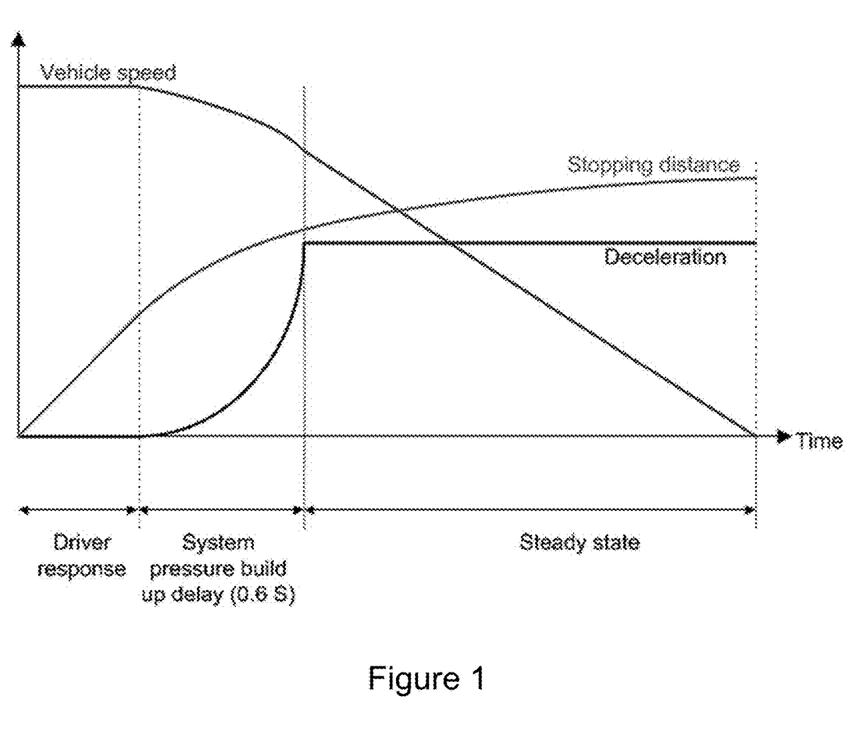
FIG. 1 shows the deceleration performance of a hydraulic brake system, depicting the car deceleration versus time.

The current practice to stop a moving automobile is the use of hydraulic system to push the brake pad against the brake disc with a set of calipers. The brake system converts the kinetic energy of vehicle motion into heat. In conventional hydraulic brake system, it takes time for the system pressure to rise and to build up friction. This is not the driver reaction time but the system reaction time which cause to lengthen the travel distance during braking. FIG. 1 depicts the car deceleration versus time.

Eddy current brakes have been introduced in the braking systems of large vehicles and trains. In eddy current brakes, DC excitation poles are arranged in the not-moving parts of brakes. The excitation poles must produce a relatively large magnetomotive force, making it difficult for an auxiliary power to supply the required energy for braking. Besides, eddy current loss generates large amounts of heat in the moving parts of the brake, which causes a temperature rise.

Energy regeneration brake systems such as the one in hybrid electric vehicles have been developed for improving fuel efficiency. In these systems, an alternator is used to recover the car kinetics energy and convert it to electricity to charge the battery. However, because of alternator limitation as well as the amount of charge that battery can accept, these systems can produce small braking force which is useful for only in soft braking. Besides, the vehicle power train architecture has to be changed and bulky batteries are needed.

An enhanced and reliable brake system that stops the car quickly in a controlled manner and without adding the delay is desired.

A conductive surface moving past a stationary magnet will have circular electric currents called eddy currents induced in it by the magnetic field, due to Faraday's law of induction. By Lenz's law, the circulating currents will create their own magnetic field which opposes the field of the stationary magnet. As a consequence, the moving conductive surface will experience a drag force from the magnet that opposes its motion.

In an electromagnetic brake, the magnetic field may be created by a permanent magnet, or an electromagnet so that the dragging or braking force can be turned on, off, or varied by changing the electric current in the electromagnet's windings.

One object of this invention is to achieve a new way to stop the car in the quickest way by eliminating system response time and applying maximum braking force on each wheel without wheel locking. Another objective of this invention is to reduce the wear on the parts as well as to save energy. In this approach, the car's kinetic energy is used to enhance the braking.

One embodiment of the present system includes a linear alternator such as a linear induction generator which is controlled by a power electronics converter interface to capture the car's kinetic energy and generate braking force on the wheel. The alternator is engaged by means of driver or operator input. The power electronics interface controls the slip frequency of the alternator based on required braking force. The current flows in the stator of linear induction alternator and induces a large current on the rotor disc. The circulated current in the rotor disc generates electric losses. In this system, the energy required for braking can be provided by the generated electric power. As a result, a non-locking braking system can be designed so that the braking operation is supported even when the main circuit fails. The system only requires energy for initial excitation that can be provided by self-excitation of an induction alternator or an auxiliary battery or other source of energy.

In one embodiment, the primary (stator) of the linear induction alternator is arranged as part of a circle or an arc. The coils in the primary (stator) of the linear induction alternator form a multi-phase alternator with an even number of poles windings, i.e., 3 phase and 6 poles. Of course in other embodiments, other numbers of phases and poles are possible.

The power electronics converter works as a variable voltage, variable frequency inverter which is used for excitation of the linear induction generator and also controlling the magnitude and frequency of currents in the linear induction generator. In one embodiment of the invention, one or more capacitors are used in conjunction with the power electronics converter to produce an initial excitation current for self-excitation of the induction alternator. In another embodiment of the invention an auxiliary power source may be used only for initial excitation and after initial excitation, the required excitation current is produced using kinetic energy of the vehicle by utilizing the power electronics converter that controls the voltages supplied to windings of the induction alternators.

In one embodiment, the generated power is consumed by resistive losses in the coil windings of primary (stator) and disc rotor (secondary) and core losses in the primary (stator) of linear induction alternators, which means the inverter may set the output power to zero and the resistive and core losses of alternator act as braking resistors. In this embodiment, the inverter is controlled to adjust the active power for balancing the generated power and losses of alternator and attached power electronics converter while maintaining the required braking force. At the same time, the inverter supplies the appropriate excitation currents to the linear induction alternators.

In another embodiment, the generated power can be used to charge a battery or can be burned into braking resistors.

Figure 2:
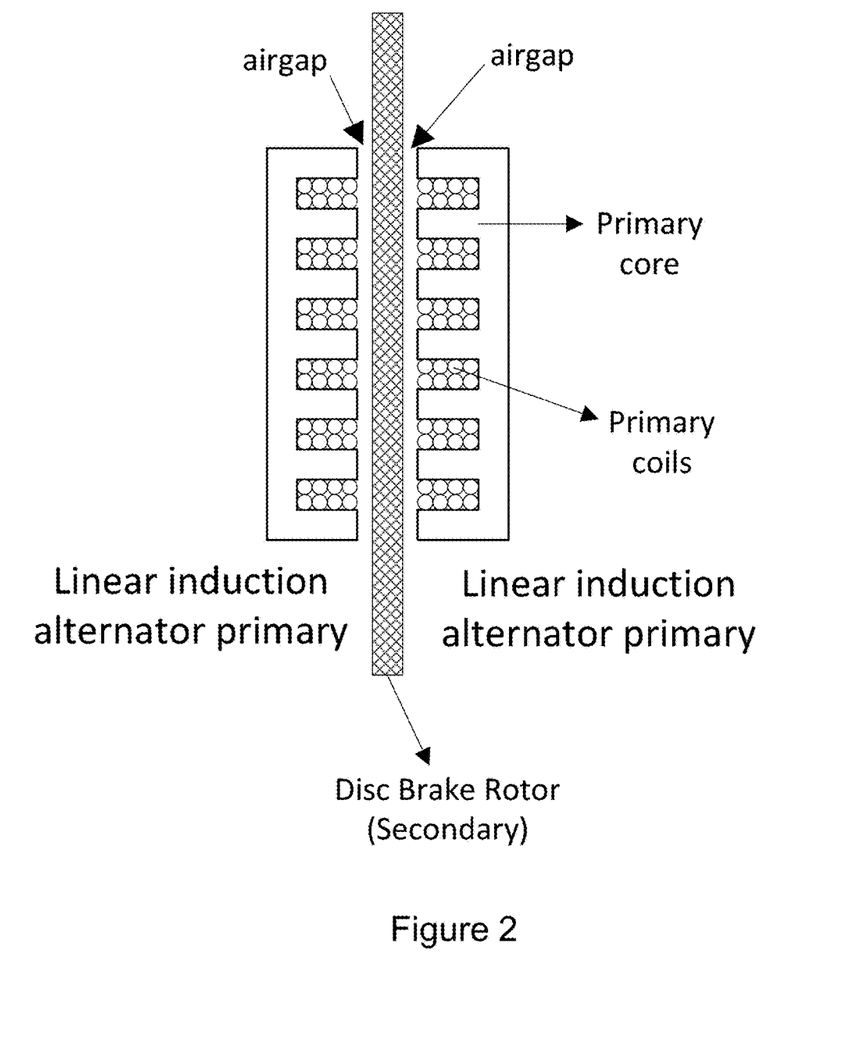
FIG. 2 shows one embodiment of wheel brake system of the present disclosure.
Figure 3:
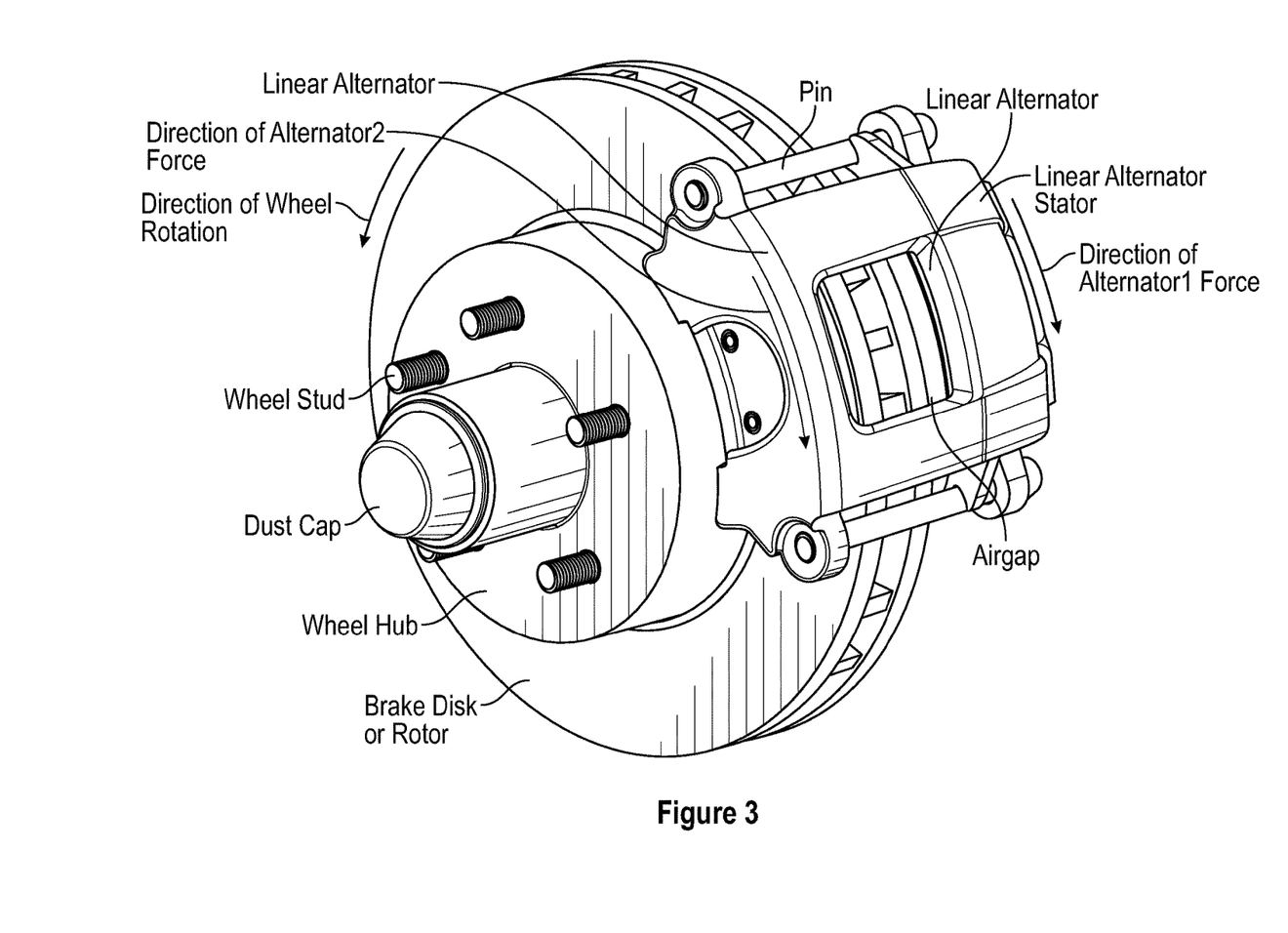
FIG. 3 shows another embodiment of an enhanced braking system of the present disclosure.

FIGS. 2 and 3 show one embodiment of the invention. On each side of the disc brake rotor (secondary), a linear induction alternator primary (stator) is placed. Collectively, these two alternators form a double-side linear induction alternator. Each air gap shown in FIG. 2 is of a predetermined distance. The range of distance can be from about 0.1 mm to 5 mm. In another embodiment, a stator (primary) of linear induction alternator is arranged as circle or part of circle in close proximity of a brake drum, which brake drum acts as a linear induction alternator secondary.

In one embodiment of this system, the linear alternators are linear induction machines. However, any other type of the electric machines can be adopted, such as a linear permanent magnet alternator or a linear switched reluctance generator. Linear alternators include primary (stator) and secondary (brake disc rotor). The brake disc rotor acts as a rotary translator for both the alternators. The linear alternators can be a ring or a sector of any size. In some embodiments, the linear alternators may be adapted in a wheel brake housing or assembly to be adapted about a portion of the brake disc, as shown in FIG. 3. This wheel brake housing may further include a wheel brake controller and a power electronics converter. The primary of the linear alternators includes one or more pieces of iron core and coils. The coils form multiple phases and multiple poles. As seen in FIG. 3, the force created by the inductors act in a direction opposite to the direction of wheel (and brake disc) rotation, and as such act to cause frictionless braking of the brake disc and wheel (and thus axle and vehicle itself). Although the linear alternator can have a different number of phases, in one embodiment of this system, the linear induction alternators are 3-phase. Note that this brake arrangement may be installed at the same place as conventional brake calipers with no change in powertrain architecture. Further with this system, no replacement brake pads or maintenance is needed.

Figure 4:
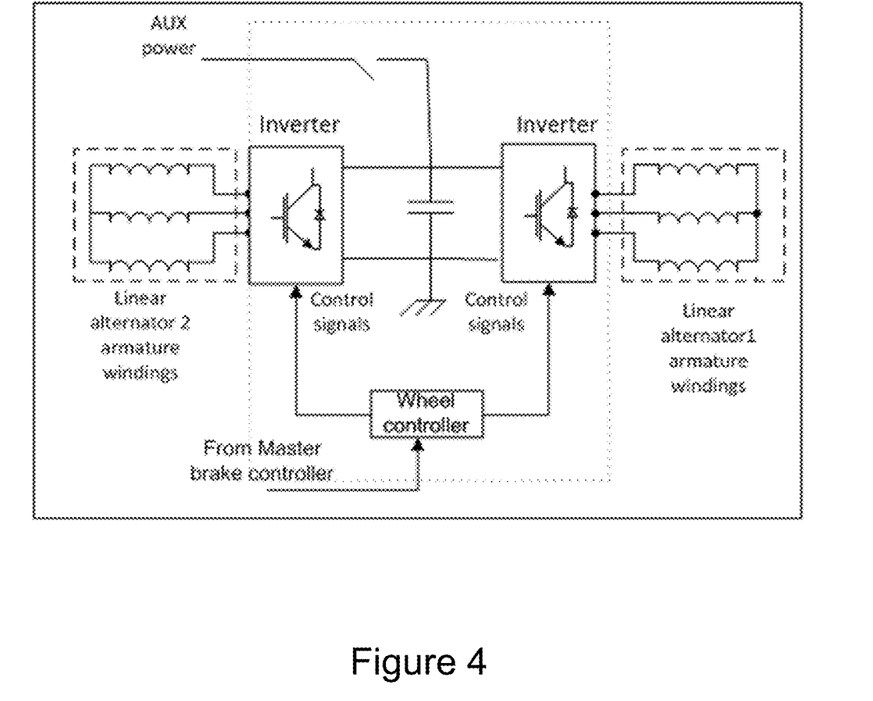
FIG. 4 shows a schematic of electrical connections of an embodiment of an enhanced braking system with 3-phase windings in the motor and alternator.

In another embodiment of this system, two power electronics converters are arranged as shown in FIG. 4. FIG. 4 shows one embodiment of a wheel brake controller, which may be integrated into a wheel brake housing. As seen in FIG. 4, the wheel brake system includes a wheel controller, which is configured to receive braking control signals from a master brake controller. In an embodiment, the wheel controller may be implemented as one or more integrated circuits such as a microcontroller unit. The wheel controller may receive a required braking force command from a master brake controller and control corresponding power electronics converter(s) to produce a required braking force. Note that the wheel controller may also control circulation of magnetizing currents. As further illustrated in FIG. 4, in one embodiment, there is one linear induction alternator primary (stator) on each side of the disc and each linear alternator is controlled by a separate inverter.

In the embodiment shown in FIG. 4, a 3-phase winding configuration in the alternator has been depicted. However, alternators can have any other number of phases. In FIG. 4, an AUX power source may be switchably coupled to provide the initial energy to excite both alternators. Aux power can be provided by a main car battery or separate battery or one or more super capacitors or one or more capacitors. In another embodiment, the need for AUX may be eliminated by one or more capacitors coupled to linear alternator windings or power electronics converter(s). In this embodiment, the energy stored in capacitor(s) provide initial excitation current to the linear induction alternators. The linear induction alternator(s) and/or associated power converter(s) may store energy in the capacitor(s) during normal car driving cycle to provide required excitation current during braking.

Figure 5:
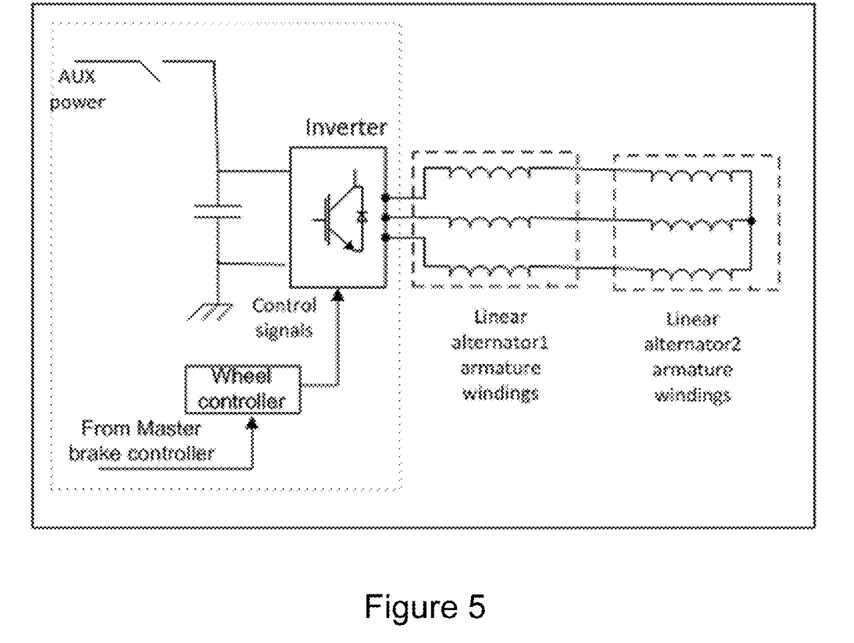
FIG. 5 shows a schematic of electrical connections of another embodiment of an enhanced braking system in which one inverter controls both linear alternators.
Figure 6:
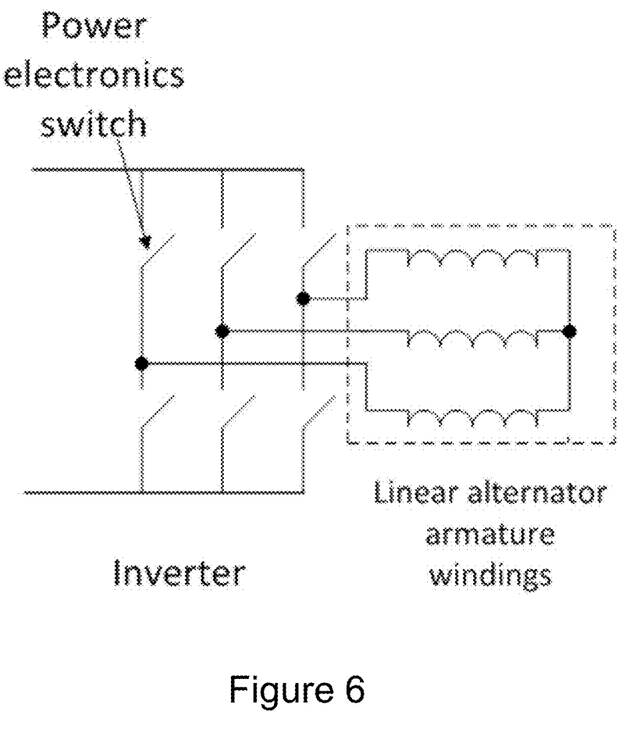
FIG. 6 shows a schematic of inverter topology of an embodiment of an enhanced braking system.

FIG. 5 shows another embodiment in which only one inverter controls both linear alternators. The topology of power electronics converter can also be any other type. In FIG. 6, one embodiment of a converter topology has been shown. The converter provides three-phase power to the linear alternator, via appropriate control of power electronic switches (which may be controlled by the wheel controller). Power electronics switches can be metal-oxide-semiconductor field-effect transistor (MOSFET) or insulated-gate bipolar transistor (IGBT) or Silicon Carbide (SiC) MOSFETS or silicon controlled rectifier (SCR) or any other type of controlled switches.

Figure 7:
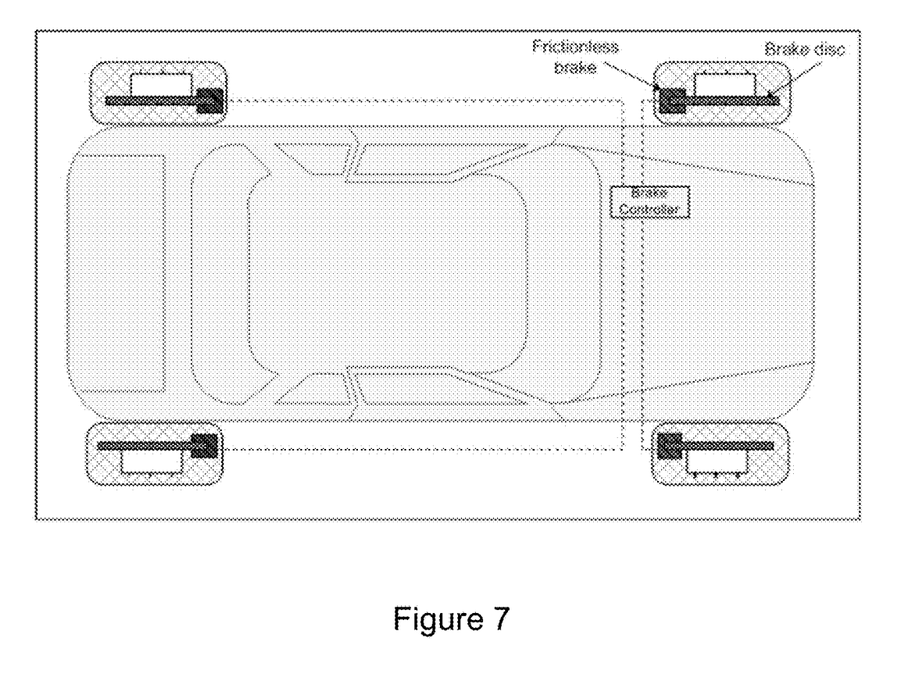
FIG. 7 shows one embodiment of a vehicle brake system architecture of this disclosure.

FIG. 7 shows one embodiment of a vehicle brake system architecture. In the embodiment shown, a 4 wheel brake system is installed. A master brake controller controls braking force distribution on all 4 wheels. This master brake controller sends signals to each wheel brake controller based on driver input and dynamic weight distribution. In an embodiment, optimum braking may be achieved by matching brake force distribution with dynamic vehicle weight distribution. And, since the highest deceleration is achieved when all four wheels are just about to skid, stopping distance can be minimized by front to rear braking force balance. The brake controller may be integrated into the wheel brake or any other location in the vehicle. The driver input may be received by brake pedal translation or driver force on brake pedal.

In another embodiment, the driver input may be replaced by an automatic braking system request such as from an accident prevention system or in an autonomous driving car by sensory information and/or vehicle-to-vehicle communication information.

Figure 8:
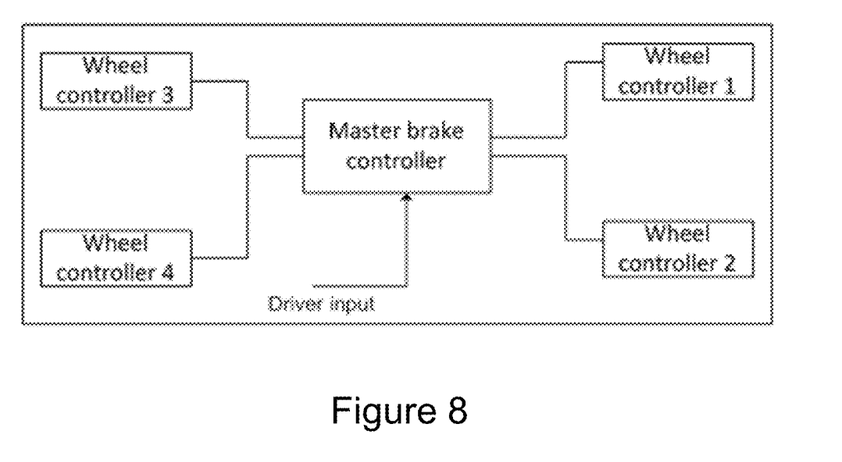
FIG. 8 shows a schematic of an embodiment of a vehicle brake system controller.
Figure 9:
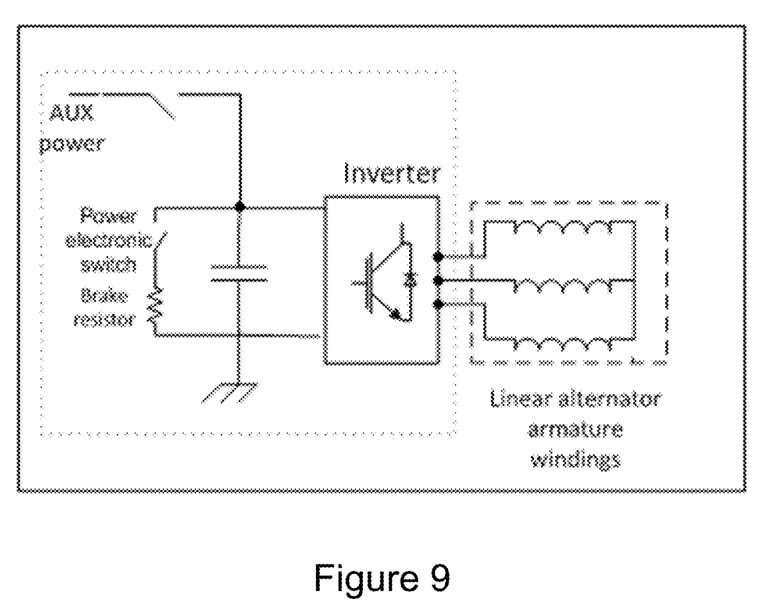
FIG. 9 shows a schematic of electrical connections of an embodiment in which a braking resistor is used for the condition that alternator output power is not zero.

FIG. 8 shows another embodiment of a vehicle brake system controller. The master brake controller sends signals to each wheel brake controller based on driver input and dynamic vehicle weight distribution. In one embodiment of the invention, a wheel brake controller is integrated into the wheel brake assembly. It receives the signal with information of the required braking force from the master brake controller. The wheel brake controller controls the wheel inverter to produce the required braking force in the linear alternator at very large slip frequency to produce high losses and zero to negligible output power. The converter also controls the circulation of excitation currents in the alternator and charging of capacitors if there exist any. In another embodiment of the invention, the alternator output power can be more than zero, which will be used to charge a battery or burn it to a braking resistor. FIG. 9 shows one embodiment of the invention that uses a braking resistor for the condition that alternator output power is not zero.

In the instant system, kinetic energy of the vehicle or of the moving device is captured through an alternator. However in contrast to other approaches; there won't be any friction and a large external power source is not needed. In this invention the captured car kinetic energy is used to stop the vehicle in the fastest and safest possible way. This brake system can be installed on the brake disc of each wheel without modification to the power train of the vehicle.

What is claimed is:

1. An apparatus comprising:
    a brake disc adapted about an axle of a vehicle and having a first side and a second side;
    a first induction generator adapted about the first side of the brake disc in a non-contact manner;
    a second induction generator adapted about the second side of the brake disc in a non-contact manner; and
    wherein responsive to an initial excitation current, the first induction generator and the second induction generator are to produce a self-excitation current using kinetic energy of the vehicle to generate a frictionless braking force on the brake disc, wherein the first and second induction generators operate at a slip frequency to generate loss in the first and second induction generators.

2. The apparatus of claim 1, wherein the first and the second induction generators comprise multi-phase alternators.

3. The apparatus of claim 1, wherein the first and second induction generators capture the kinetic energy of the vehicle.

4. The apparatus of claim 1, wherein the apparatus is to control an output power to zero, and wherein generated power is consumed by loss in the brake disc and the first and second induction generators.

5. The apparatus of claim 1, further comprising:
    a first inverter coupled to the first induction generator;
    a second inverter coupled to the second induction generator; and
    a wheel controller to receive a control signal from a master controller and to send a first control signal to control the first inverter and a second control signal to control the second inverter.

6. The apparatus of claim 5, wherein the apparatus comprises a vehicle, the vehicle comprising:
    the master controller; and
    a plurality of brake housings, each of the plurality of brake housings including a plurality of induction generators, at least one inverter, and a wheel controller coupled to the master controller.

7. The apparatus of claim 1, further comprising:
    at least one inverter coupled to the first induction generator and the second induction generator, wherein the first induction generator comprises a first stator having a first plurality of coils and the second induction generator comprises a second stator having a second plurality of coils, the brake disc comprising a rotor for the first stator and the second stator; and
    a wheel controller to receive a control signal from a master controller and to send a second control signal to control the at least one inverter.

8. A frictionless electromagnetic braking system for a wheel of a vehicle or a moving device comprising:
    a brake disc having two sides;
    a first linear alternator, a primary of the first linear alternator separated by a first air gap of a predetermined space from one side of the brake disc, the primary of the first linear alternator comprising a first core and a first plurality of coils adapted about the first core;
    a second linear alternator, a primary of the second linear alternator separated by a second air gap of a predetermined space from a second side of the brake disc, the primary of the second linear alternator comprising a second core and a second plurality of coils adapted about the second core;

wherein, the first and second linear alternators are engaged by an external input, and the first and second linear alternators are controlled by a power electronics interface to generate a frictionless braking force on the brake disc and on the wheel, wherein the first and second linear alternators act as inductors that operate at a slip frequency to generate loss in the first and second linear alternators.

9. The frictionless electromagnetic braking system of claim 8, wherein the first and second linear alternators comprise linear induction alternators.

10. The frictionless electromagnetic braking system of claim 8, wherein the first air gap and the second air gap are of the same predetermined space.

11. The frictionless electromagnetic braking system of claim 8, wherein the external input is generated by at least one of a driver of the vehicle or moving device or an automatic braking system of the vehicle or moving device.

12. The frictionless electromagnetic braking system of claim 8, wherein the brake disc acts as a secondary for the first and second linear alternators.

13. The frictionless electromagnetic braking system of claim 8 wherein the external input comprises an initial excitation current, and wherein the first and second linear alternators are to produce a self-excitation current using kinetic energy of the vehicle or moving device to generate the frictionless braking force.

14. The frictionless electromagnetic braking system of claim 8, wherein the first and second linear alternators comprise multi-phase alternators.

15. The frictionless electromagnetic braking system of claim 8, wherein the first and second linear alternators capture kinetic energy of the vehicle or moving device.

16. The frictionless electromagnetic braking system of claim 8, wherein the power electronics interface is to control an output power of the frictionless electromagnetic braking system to zero, and wherein generated power is consumed by loss in the brake disc and the first and second linear alternators.

17. The frictionless electromagnetic braking system of claim 8, further comprising one or more inverters that control the first and second linear alternators, wherein the one or more inverters control output power of the first and second linear alternators, and wherein the one or more inverters supply excitation currents for the first and second linear alternators.

18. The frictionless electromagnetic braking system of claim 17, wherein the one or more inverters further comprise a battery or a braking resistor for receiving output power of the first and second linear alternators.

19. The frictionless electromagnetic braking system of claim 17, further comprising one or more wheel controllers and a master brake controller, wherein the one or more wheel controllers control the one or more inverters, wherein the master brake controller controls the one or more wheel controllers, and wherein the master brake controller receives the external input.

20. The frictionless electromagnetic braking system of claim 8, further comprising one or more wheel controllers and a master brake controller, wherein the one or more wheel controllers control the linear alternators, wherein the master brake controller controls the wheel controllers, and wherein the master brake controller receives the external input.

* * * * *